United States Patent Office 3,848,030
Patented Nov. 12, 1974

3,848,030
OPTICAL ISOMERS OF BINAPHTHYL-
PHOSPHORIC ACIDS
Rene Viterbo and Jean Jacques, Paris, France, assignors to Richardson-Merrell S.p.A., Naples, Italy
No Drawing. Filed Mar. 10, 1972, Ser. No. 233,793
Claims priority, application Italy, Mar. 18, 1971, 49,167/71
Int. Cl. C07f 9/12
U.S. Cl. 260—936      8 Claims

ABSTRACT OF THE DISCLOSURE

Optical isomers of the formula

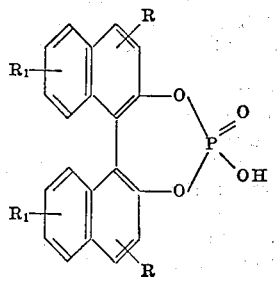

in which R and $R_1$ are hydrogen, halogen, lower alkyl, or nitro, and their corresponding bi-4,5,6,7-tetrahydronaphthyl compounds, their preparation, and use in separating other isomers.

BACKGROUND OF THE INVENTION

The present invention is concerned with new chemical resolving agents which are acid in character and can be used to separate isomers, such as geometric, spatial or optical isomers, containing basic groups. Since the chemical synthesis of compounds may result in the production of mixtures of isomers which may have differing properties, the methods of separating such isomers are of practical importance.

Commercially, resolution may be accomplished by reacting a racemic modification with an optically active material to give two diastereoisomeric derivatives, illustratively, salts which can be separated. For example, reacting a racemic base (±)-B with an optically active acid, (−)-A, would produce molecules of salt either (−)-A.(+)-B or (−)-A.(−)-B. If the resulting diastereoisomers have different properties they can be separated. The most desirable method of separating such diastereoisomers is by selective crystallization, although distillation or chromatographic separation techniques have been used.

To be a good resolving agent for the separation of isomers, an optically active material should readily react with a racemate to form diastereoisomers which can be separated and readily decomposed to produce the free isomers. Further, a good resolving agent should be relatively inexpensive and quantitatively recoverable after completion of the resolution. Of course, to effect good resolution, the resolving agent must be preparable in an optically pure state, since the substance to be resolved cannot be obtained in a higher state of optical purity than the resolving agent used in its preparation.

For the resolution of bases, 10-camphorsulfonic acid, hydroxymethylene camphor, camphoric acid, tartaric acid, diacetyltartaric acid, malic acid pyrrolidone-5-carboxylic acid, and glutamic acid have previously been used.

This invention involves the optical isomers of the formula

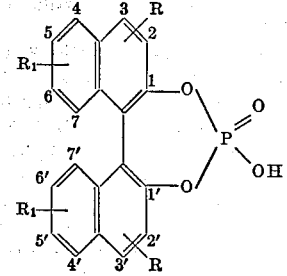

in which R and $R_1$ are symmetrical and independently H, F, Cl, Br, lower alkyl of 1 to 8 carbon atoms inclusively, or $NO_2$, and their corresponding bi-4,5,6,7-tetrahydronaphthyl compounds, and their preparation and use in separating isomers of other compounds.

The above compounds of the formula and particularly their enantiomorphs are useful in separating basic organic compounds, capable of optical activity, into optical antipodes. The addition salts consisting of the above enantiomorph and the optical isomers of other organic compounds are also new compounds within the scope of the present invention.

The compounds of the above formula are also useful in the separation of structural isomers or basic olefinic compounds having geometrical cis and trans isomeric forms and compounds formed therewith are also included within the scope of this invention. While the chief use for the resolution of diastereomers and enantiomorphs of compounds is to separate compounds of interest because of pharmacological activity, the methods and reagents disclosed herein have general application in conjunction with compounds of other interest such as polarizing filter material or polymer production.

The resolving compounds of this invention are strong monovalent acids which more readily produce but one pair of salts for resolution. They are particularly advantageous in being less expensive than the prior art compounds generally used for this purpose. An additional advantage is the great difference in optical rotation between the + and − forms, thereby facilitating resolution and analysis of resolution of isomers, forms, and crystals having greater differences in physical properties.

The phosphates of this invention are binaphthyl [2,1-d; 1′,2′-f] [1,3,2]dioxo phosphohepin derivatives and inclusive of the corresponding bi-4,5,6,7-tetrahydronaphthyl compounds, but for convenience are identified herein as binaphthylphosphoric acids.

The preparation of binaphthyl-2,2′-diols from β-naphthol using $FeCl_3$ is described by Pummerer, R. et al., Chem. Ber. 59, 2159 (1926). Similarly substituted binaphthyl-2,2′-diols as desired are made using alkyl and/or halogen substituted naphthol as starting material. The preparation of the racemate of binaphthylphosphoric acid by reacting the diol with $POCl_3$ is described by Marschalk, C., Bull. Soc. Chem., France, 43, 1395 (1926). Similarly the binaphthyl phosphoric acids are conveniently prepared by the action of $POCl_3$ on the binaphthyl-2,2′-diols dissolved in suitable aprotic solvent, such as benzene, toluene, xylene, tetrahydrofuran, ethyl ether, pyridine, petroleum ether, or other aromatic or aliphatic hydrocarbon solvent. The reaction is carried out in the presence of suitable basic compounds able to form salts with the HCl split off during the reaction; illustratively useful basic compounds are anhydrous sodium carbonate or bicarbonate, or other basic alkali metal salt, or organic tertiary nitrogen base, such as pyridine, alkylpyridine, triethylamine, dimethylaniline. The reaction temperature is suitably in the range of from about 0° to about 50° C. and the time of reaction is between about 20 minutes and about 6 hours, depending on the reactivity of compounds and reaction temperature. Pressure is not critical and can be atmospheric, higher or lower.

If a nitro substituted binaphthyl phosphoric acid is desired, the nitro groups may be introduced at any state, whereas alkyl and halogen substituents are preferably present in the mononaphthol.

The reaction mixture is diluted with water. The solution, neutralized or cautiously acidified by addition of strong inorganic acid, gives salts of binaphthylphosphoric acids with the organic nitrogen base used in the reaction. If the said solution of the salts of binaphthylphosphoric acids is treated with strong inorganic acid, for example by stirring this acidified mixture at a temperature chosen in the range of from about 0° to about 50° C. for a time between about 20 minutes to about 3 hours, the racemic binaphthylphosphoric acids are obtained.

Although these acids contain no asymmetric atoms in their molecule, they can be resolved into two optical antipodes.

Satisfactory resolution for our acids was achieved using cinchonine or cinchonidine, but any other optically active bases (+ or − isomer) illustratively brucine, quinine, quinidine, morphine, strychnine, ephedrine or α-phenylethylamine are also suitable for resolving our compounds. Neutralization reaction is effected in suitable solvent such as methanol, ethanol or acetone. To the so obtained solution water is added.

The precipitate is collected by filtration and the filtrate is saved. The addition salts [(+) or (−) BPA. (+) or (−) base] are obtained in good yield and purity; they are stable and easily crystallizable. By acidification, the addition salts give (+ or −)-binaphthylphosphoric acids (BPA). To the salts suspended in a water miscible solvent, such as methanol, ethanol or acetone, a strong inorganic acid is added and the (+ or −)-BPA is collected and crystallized from suitable solvent, such as methanol, ethanol or water.

The stored mother solution is concentrated under vacuum to small volume and the precipitate is the salt of optically active base with the other [(−) or (+)] isomer of BPA. This salt is treated with strong inorganic acid to give the (− or +)-binaphthylphosphoric acids.

To (+ or −)-binaphthylphosphoric acids, or to the salt of (+ or −)-BPA and optically active base (above described), or to the other salts of our BPA with alkali metal, dissolved or suspended in a water miscible solvent, such as methanol, ethanol or acetone, is added a racemic base, illustratively adrenaline aminoacids, lysine, glutamic acid, tryptophane amphetamines, metamphetamines basic antibiotics, lincomycin, 7-chlorolincomycin, tetracyclines, d,l-aminocephalolactam and basic antibiotic moieties, atropine, scopolamine, catecholamines, ephedrine, N-methylephedrine, epinephrine, N-methylepinephrine, methadone, propoxyphene, meperidine, morphine, α-hydrazino - α - methyl-β(3,4-dihydroxyphenyl)propionic acid, pheniramine, chlorpheniramine, brompheniramine, phenothiazines, promethazine, thioridazine, tryptamines, α-ethyltryptamines, α-allylphenethylamine, threo-1-p-methylmercaptophenyl - 2 - aminopropane-1,3-diol, methylphenidate, α-p-ethoxyphenylamine-N-n-propylpropionamide, perhexiline, prostaglandins and their intermediates, diethylpropion, α,α-diphenyl-α-(2-piperidyl)-methanol, p-(3 - hydroxy - propioxy)-phenylamino-N-n-propyl-propionamide, DOPA, pentazocine, cyclazocine, hydroxyproline.

The reaction is conveniently performed below the decomposition temperature and preferably in the range of from about 10° C. to about 40° C. and the time of reaction between about 1 to about 24 hours is usually adequate.

The diastereoisomeric salts are collected by filtration and the solution is stored for the recovery of the other isomer of the said compounds. The filtered salt is crystallized from suitable solvent, such as water, methanol, ethanol, acetone or a mixture of two or more of them. The purified salts are dissolved or suspended in suitable solvent such as water, methanol or ethanol and treated in the following way:

The pH is adjusted to 1.0 by addition of strong inorganic acid. The precipitate, (+) or (−) binaphthylphosphoric acids, is collected by filtration and saved for further preparations. The filtrate may be made alkaline by addition of strong inorganic base and extracted with a water non-misicble solvent, such as ethylether, ethylacetate, benzene or chloroform. Alternatively the filtrate may remain acid or be neutralized or partially neutralized prior to extraction. The organic layer is concentrated and the isomer residue is crystallized from a suitable solvent such as methanol, ethanol, water, ethylacetate or a mixture of two or more solvents.

The organic layer can be also treated with a suitable solution of organic or inorganic acid yielding salts of the optically active basic compound isomers. The salts are crystallized from methanol, ethanol, water, ethylacetate or a mixture of two or more solvents.

Alternatively, the pH is adjusted to strongly alkaline, about 10.0, by addition of NaOH or KOH solution and extracted with water non-miscible solvent such ethylether, benzene, toluene or chloroform. The aqueous solution is stored for recovery of (+) or (−)-BPA; the organic layer is concentrated and the residue is crystallized or made into a salt as described above. The stored mother solutions are concentrated to crystallization. The precipitate is the salt formed by (+) or (−) BPA and other optically active isomer of the compound split into optical isomer. Splitting the salt yields the free isomer.

For separation of geometric or structural isomers, racemic of enantiomorph binaphthylphosphoric acids are added to compounds capable of geometric or structural isomerism, such as clomiphene or other basic olefinic compounds, dissolved or suspended in water, methanol, ethanol, acetone or a mixture of two or more solvents, reacted at a temperature in the range of from about 0° to about 40° C. The reaction time is between about 3 minutes to 24 hours. The reaction mixture is allowed to settle the resulting isomer. The precipitate is collected by filtration and the solution is stored for recovery of the other isomer.

The precipitate is crystallized from suitable solvents such as methanol, ethanol, water or a mixture. It is formed by BPA, isomer or racemic, and the cis (or trans) isomer of the basic olefinic compound.

The purified salt is dissolved or suspended in water, water immiscible solvent, methanol or ethanol and treated as follows:

The pH is adjusted to 1.0 by addition of strong organic acid. The precipitate, racemic or optical isomers of BPA, is collected by filtration and stored for further preparation; the solution is made alkaline by addition of strong inorganic base, and extracted with a water non-miscible solvent, such as ethylether, ethylacetate, benzene, toluene or chloroform. The organic layer is concentrated and the residue is crystallized from a suitable solvent, such as methanol, ethanol, water, ethylacetate or a mixture, to give cis or trans isomer of the used compounds.

The organic layer can be also treated with a solution of organic acid, illustratively citric, maleic or tartaric, or inorganic acid such as HCl or HBr, yielding salts of cis (or trans) basic isomer of said compounds which are crystallized from a suitable solvent such as methanol, ethanol, ethylacetate, acetone, water or a mixture.

Alternatively, the pH is adjusted to 10.0 by addition of NaOH or KOH solution and the mixture is extracted with a water immiscible solvent. The aqueous solution is stored for recovery of binaphthylphosphoric acid; the organic layer is concentrated and the residue is crystallized or made into a salt as described above.

The stored mother solution is concentrated to precipitation. The precipitate is the salt formed by racemic or optical isomers of binaphthylphosphoric acid and the other trans (or cis) isomer of the used olefinic compound. It is purified and recovered as described above.

Similarly, the cis and trans isomers are separated from triprolidin, cycliramin, pyrrobutamin, hexadilin, and cyclethrin.

The phosphoric acid esters of our invention are particularly useful for the resolution of racemic compounds into their optical isomers. The phosphoric acid esters are also useful for the separation of cis from trans isomers. Additionally, the phosphoric acid esters of this invention are easily prepared, starting from inexpensive synthetic intermediates, are quantitatively split into their optical isomers, are strong acids and have a high molecular weight and a high rotary power, do not dissolve in water, and are very stable and do not racemize.

The optical isomers of our acids give stable and well crystallizable salts with basic optically active isomers; as the precipitation of one of the possible salts is quantitative and the precipitate is essentially free from the other salt, we are able to obtain one optical isomer from insoluble salt and the other optical isomer from the soluble salt, both in a good purity. If desired, further recrystallization results in further purification.

The optical isomers of binaphthylphosphoric acids or BPA which have been used in the resolution of basic racemic compounds, are recovered with good yield. They can be repetitively used in separations of isomers. The chemical stability and property of forming crystalline salts with isomers such that isomers are readily separable is important in using racemic or optical isomers of binaphthylphosphoric acids in the separation of cis-trans isomers.

These same advantages are not available in other compounds generally used in the resolution of racemic compounds and in the separation of cis-trans isomers.

EXAMPLE 1

Binaphthylphosphoric Acid 7.5 ml. of $POCl_3$, freshly prepared by distillation, are added dropwise and under stirring to 17.7 grams of $\alpha$-binaphthyl-2,2'-diol suspended in 80 ml. of anhydrous pyridine. Furthermore, stirring is continued for one hour more at room temperature. The mixture is cooled to 0° C. and water is cautiously added in order to dissolve the formed precipitate, followed by acidifying with 6N HCl, whereby pyridine BPA salt precipitates. The salt is collected by filtration and crystallized from anhydrous ethanol.

Calculated for $C_{25}H_{18}O_4NP \cdot H_2O$ (percent): C, 67.40; H, 4.53. Found (percent): C, 67.7; H, 4.3.

This compound is suspended in 40 ml. of a stirred solution of 6N HCl. The mixture temperature is slowly raised to 40° C., whereupon the amorphous precipitate becomes crystalline (conglomerate-form $\alpha$), and is crystallized from ethanol.

Calculated for $C_{20}H_{13}O_4P$ (percent): C, 68.96; H, 3.77. Found (percent): C, 68.9; H, 4.0.

The pyridine binaphthylphosphoric acid salt is dissolved in water and made alkaline by addition of 2N NaOH solution. The mixture is extracted with chloroform. The organic layer is discarded and the aqueous solution is acidified with 6N HCl. The precipitate of racemic binaphthylphosphoric acid is collected by filtration, washed with water and dried. I.R. Spectra (Nujol): 1305; 1230; 1205; 1045; 1030; 990; 975; 950; 890 cm.$^{-1}$. The methyl ester is prepared by adding 5 ml. of ethereal solution of diazomethane to 373 mg. of binaphthylphosphoric acid suspended in 3 ml. of methanol. The mixture is left to react for 30 minutes and is evaporated to dryness. The residue is crystallized from methanol. 125 mg. of methyl ester are collected. M.P. 210–211° C. NMR=3.98 and 3.96 p.p.m.

EXAMPLE 2

Binaphthylphosphoric Acid

Using 43.0 grams of $\alpha$-binaphthyl-2,2'-diol, 18.1 ml. of $POCl_3$ and 242 ml. of pyridine, the reaction is carried out in the same manner as in Example 1. After addition of 5.0 ml. of water, the reaction mixture is cooled to 0° C. in an ice-bath. The pH is adjusted to 9.0 by addition of 2N NaOH solution. The mixture is stirred for one hour at room temperature and then acidified with 6N HCl, while the temperature rises to 40–50° C. The stirring is continued for 3 hours more.

The precipitate is collected by filtration, washed with water and dried. Yield: 39.4 (75%) of racemic binaphthylphosphoric acid.

EXAMPLE 3

3,3'-Dimethyl-$\alpha$-Binaphthyl-2,2'-Diol 2.5 grams of 3-methyl-$\beta$-naphthol, Miller et al., J. Am. Chem. Soc. 76,296 (1954), dissolved in 10 ml. of dioxane are added to 1300 ml. of boiling water. To this solution 8 ml. of $FeCl_3$ solution d=1.28 are added under stirring. Keep at boiling temperature for 10 minutes. Let cool. Then collect the precipitate and wash with water. The residue is suspended in boiling water, stirred for 30 minutes, then filtered and crystallized from benzene to yield 1.9 g.—M.P. 208° C. of 3,3'-dimethyl-$\alpha$-binaphthyl-2,2'-diol.

Calculated for $C_{22}H_{18}O_2$ (percent): C, 84.05; H, 5.77. Found (percent): C, 83.80; H, 5.80.

EXAMPLE 4

2,2'-Dimethyl-Binaphthylphosphoric Acid 0.7 ml. of fresh-distilled $POCl_3$ is slowly added to 1.8 grams of 6,6'-dimethyl-binaphthyl-2,2'-diol dissolved in 15 ml. of anhydrous pyridine. The mixture is stirred for 45 minutes and then water is added in order to dissolve the formed precipitate. After the addition of 20 ml. of 5% $NaHCO_3$ solution the mixture is extracted with three 100 ml. portions of ethyl ether. The organic phase is discarded. The aqueous solution acidified with 2N HCl gives an amorphous precipitate. M.w.: 379 (calculated 376 for $C_{22}H_{17}O_4P$).

If the mentioned alkaline solution is neutralized, we obtain a crystal precipitate, the pyridine salt of 2,2'-dimethylbinaphthylphosphoric acid, which is recrystallized from absolute ethanol. M.P. 250° C. d.

Calculated for $C_{27}H_{22}O_4NP \cdot H_2O$ (percent): C, 68.50; H, 5.11. Found (percent): C, 68.30; H, 5.00.

Preparation of the methyl ester is accomplished by dissolving the amorphous precipitate consisting of the free acid in ethyl ether and when cold, about 0° C., adding to an ethereal solution of diazomethane. The solution is left at room temperature for two hours, dried and then crystallized from methanol. The methyl ester of 2,2'-dimethyl-binaphthylphosphoric acid is obtained. M.P. 198° C.

Calculated for $C_{23}H_{19}O_4P$ (percent): C, 70.77; H, 4.91. Found (percent): C, 70.6; H, 4.9.

EXAMPLE 5

6,6'-Dibromo-$\alpha$-Binaphthyl-2,2'-Diol 29.6 grams of $Br_2$ dissolved in 80 ml. of acetic acid are added dropwise, under stirring, to a mixture of 24 grams of $\alpha$-binaphthyl-2,2'-diol dissolved in 400 ml. of glacial acetic acid. The reaction mixture is stirred for 90 minutes more. $N_2$ is bubbled through the solution to remove the excess of HBr. The solution is poured into 1500 ml. of water and the precipitate is collected and recrystallized first from glacial acetic acid and then from benzene to yield 17 g. of 6,6'-dibromo-α-binaphthyl-2,2'-diol. M.P. 199–200° C.

Calculated for $C_{20}H_{12}Br_2O_2$ (percent): C, 54.09; H, 2.73; Br, 35.99. Found (percent): C, 53.92; H, 2.86; Br, 35.75.

|  | $\lambda_{max.}$ (mμ) | ε = |
|---|---|---|
| U.V. in EtOH | 231 | 112,350 |
|  | 267 | 11,400 |
|  | 277 | 11,500 |
|  | 344 | 7,100 |

In place of 6,6'-dimethylbinaphthyl-2,2'-diol in this example, using gossypol reacted with $POCl_3$ produces the corresponding substituted binaphthyl phosphoric acid.

Substituting chlorine or fluorine for bromine produces the corresponding chloro and fluoro derivatives.

EXAMPLE 6

5,5'-Dibromo-Binaphthylphosphoric Acid 2.4 ml. of $POCl_3$, just distilled, are added dropwise under stirring to a solution of 5.5 grams of 6,6'-dibromo-α-binaphthyl-2,2'-diol dissolved in 50 ml. of anhydrous pyridine. The reaction mixture is stirred at room temperature for 15 minutes more. Then 1 ml. of $H_2O$, 5.5 grams of $NaHCO_3$ and 100 ml. of 5% $NaHCO_3$ are added in the same sequence. The crystalline precipitate is collected by filtration, washed with water and dried. Yield: 5.48 grams. The compound, pyridine salt, is suspended in 70 ml. methanol and 10 ml. of HCl 6N; the precipitate is filtered, washed with methanol twice and dried to yield 5,5'-dibromo-binaphthyl-phosphate acid.

Calculated for $C_{20}H_{11}Br_2O_4P$ (percent). C, 47.46; H, 2.20; Br, 31.60; P, 6.1. Found (percent): C, 47.60; H, 2.49; Br, 31.87; P, 5.85.

|  | $\lambda_{max.}$ (mμ) | ε = |
|---|---|---|
| U.V. in EtOH | 223 | 105,500 |
|  | 233 | 90,000 |
|  | 270 | 8,900 |
|  | 303 | 11,900 |
|  | 318 | 7,100 |
|  | 333 | 7,450 |

The corresponding chloro and fluoro substituted compounds are made by substituting the chloro or fluoro α-binaphthyl-2,2'-diols, obtained in Example 5, as starting material in place of the bromo compound.

EXAMPLE 7

6,6'-Dinitro-α-Binaphthyl-2,2'-Diol

A mixture of 20 grams of α-binaphthyl-2,2'-diol, 8.4 grams (5.6 ml.) of $HNO_3$ 99%, and 466 ml. of acetic acid is heated at 100° C. for 60 minutes under stirring. The reaction mixture is poured into water. The recipitate, collected by filtration and washed with water, is suspended in 300 ml. of NaOH 4N under stirring. The residue is filtered off and the solution is acidified with 6N HCl. The precipitate obtained is filtered, washed with water and dried. Yield: 16.5 grams. Crystallize from dioxane-water (1:2) and again from dioxane-ethanol (10:7). Yield: 6.6 grams of 6,6'-dinitro-α-binaphthyl-2,2'-diol.

Calculated for $C_{20}H_{12}N_2O_6$ (percent): C, 63.83; H, 3.21; N, 7.44. Found (percent): C, 63.77; H, 3.42; N, 7.34.

|  | $\lambda_{max.}$ (mμ) | ε = |
|---|---|---|
| U.V. in EtOH | 221 | 64,300 |
|  | 256 | 24,250 |
|  | 289 | 26,200 |
|  | 316 | 14,050 |
|  | 450 | 19,900 |

EXAMPLE 8

6,6'-Dinitrobinaphthylphosphoric Acid 0.64 ml. $POCl_3$ (1.07 g.), freshly distilled, are added dropwise under stirring and at room temperature to a solution of 2 grams of Example 7 compound dissolved in 8.5 ml. of anhydrous pyridine.

The reaction mixture is stirred at room temperature for 45 minutes longer. To the ice-cooled mixture are added cautiously 0.17 ml. of $H_2O$, 5.52 of $NaHCO_3$ and 100 ml. of 5% $NaHCO_3$ solution in succession.

The filtered solution, acidified with 6N HCl, is allowed to settle for 2 hours at room temperature. The obtained precipitate is filtered, washed with water, then with ethanol and dried under vacuum. Yield, 6,6' - dinitrobinaphthylphosphoric acid crystal 1.8 grams. M.P. 180° C. with decomposition.

EXAMPLE 9

Biphenylphosphoric Acid 1.28 ml. of $POCl_3$ are added under stirring to 2.5 grams of biphenyl-2-ol dissolved in 30 ml. of anhydrous pyridine. After addition, the reacting mixture is stirred for 2 hours longer. Then 1 ml. of $H_2O$, 2.6 grams $NaHCO_3$ and 40 ml. of 5% $NaHCO_3$ solution are added in succession and the mixture is stirred for 1 hour. The filtered solution is acidified with 6N HCl, settled for 2 hours at room temperature and the precipitate is separated by filtration, washed and dried to produce biphenylphosphoric acid.

Using magnolol in place of biphenyl-2-ol in this example produces the corresponding magnololphosphoric acid. Substituting biphenylphosphoric acid or magnololphosphoric acid in Examples 12 and 13 produces the corresponding separated dextro and levo isomers of biphenylphosphoric acid or magnololphosphoric acid. These isomers are used in place of binaphthylphosphoric acid separated isomers in the separation of other optical isomers as illustrated in Examples 15 through 29. Using biphenylphosphoric acid or magnololphosphoric acid racemate in place of binaphthylphosphoric acid in Examples 30 and 31 effects separation of cis and trans clomiphene. Other cis-trans isomers as disclosed herein are also separable by this technique.

Calculated for $C_{12}H_9O_4P$ (percent): C, 58.11; H, 3.66; P, 12.51. Found (percent): C, 58.17; H, 3.55; P, 12.56.

Calculated for $C_{20}H_{21}O_4P$ (percent): C, 67.40; H, 5.94. Found (percent): C, 67.4; H, 5.8.

EXAMPLE 10

Bi-(5,6,7,8-Tetrahydronaphth-1-Yl-2-Ol)

A suspension of 6 grams α-binaphth-2-ol in 60 ml. of acetic acid is hydrogenated at a temperature of 70° C. using Pt-Adams as catalyst. After 3 hours there are absorbed 1,950 ml. $H_2$ (calculated 2,000 ml.).

The catalyst is filtered and washed several times with acetic acid. The solution is concentrated under vacuum to dryness and the residue is crystallized from cyclohexane and dried under vacuum at 110° C. to produce bi-(5,6,7,8-tetrahydronaphth-1-yl-2-ol). M.P. 139° C.

Calculated for $C_{20}H_{22}O_2$ (percent): C, 81.60; H, 7.53. Found (percent): C, 81.8; H, 7.6.

EXAMPLE 11

Bi(4,5,6,7-Tetrahydronaphthyl)Phosphoric Acid 0.7 ml. of $POCl_3$ are added dropwise with stirring to a solution of 2 grams of bi-α-(5,6,7,8-tetrahydronaphthyl-2-ol) dissolved in 10 ml. of anhydrous pyridine. The mixture is stirred at room temperature for 2 hours longer. Then 1 ml. of water is added and the stirring is continued until the complete dissolution of the precipitate. During the water addition the mixture temperature rises spontaneously. The solution is acidified with 6N HCl addition and the precipitate so obtained is collected by filtration, washed and crystallized from EtOH—$H_2O$ (4:1) to yield bi-(4,5,6,7-tetrahydronaphthyl) phosphoric acid.

Calculated for $C_{21}H_{23}O_4P$ (percent): C, 68.09; H, 6.25. Found (percent): C, 68.00; H, 6.1.

METHYL ESTER 7 ml. of ethereal solution of diazomethane are added to 300 mg. of acid dissolved in ethyl ether (10 ml.). The solution is left at room temperature for 4 hours, is dried and the residue is crystallized from methanol. M.P. 211–212° C.

Calculated for $C_{21}H_{23}O_4P$ (percent): C, 68.09; H, 6.25. Found (percent): C, 68.00; H, 6.1.

If to the ice-cooled reaction mixture of $POCl_3$ and bi-α-(5,6,7,8-tetrahydronaphthyl-2-ol) the water addition is followed by $CHCl_3$ extraction, the phosphate chloride is obtained. The $CHCl_3$ solution is washed with water, $NaHCO_3$ solution and again with water and dried over $Na_2SO_4$. After filtration and solvent evaporation, the bis-(4,5,6,7-tetrahydronaphthyl)phosphate chloride product (2.5 g.) is crystallized from xylene. M.P. 239° C.

Calculated for $C_{20}H_{20}PClO_3$ (percent): C, 64.08; H, 5.36. Found (percent): C, 64.3; H, 5.5.

EXAMPLE 12

(+)-Binaphthylphosphoric Acid; (+)BPA 18.45 grams (±)-binaphthylphosphoric acid and 16.00 grams of cinchonine are dissolved in 230 ml. of hot methanol; then 100 ml. of $H_2O$ are added slowly and the solution is allowed to cool at room temperature. After 24 hours the precipitate is collected (11.8 grams) and crystallized from methanol:water (2:1).

Calculated for $C_{39}H_{35}O_4P \cdot 2H_2O$ (percent): C, 69.05; H, 5.80; N, 4.13; P, 4.57. Found (percent): C, 69.30; H, 5.75; N, 4.20; P, 4.80.

This salt of cinchonine (+) BPA is dissolved in ethanol. After acidification of the solution with concentrated HCl, the crystal precipitate is collected, washed with water and dried under vacuum and recrystallized from ethanol to provide (+)-binaphthylphosphoric acid; (+)-BPA.

Calculated for $C_{20}H_{13}O_4P$ (percent): C, 68.96; H, 3.77; P, 8.92. Found (percent): C, 69.20; H, 4.00; P, 9.10.

$[\alpha]_D^{22} = -480°$ ($CHCl_3$; c.=0.3).

EXAMPLE 13

(−)-Binaphthylphosphoric Acid; (−)-BPA 100 grams of (±)-binaphthylphosphoric acid and 87 grams of cinchonidine are dissolved in 480 ml. of hot ethanol. 200 ml. of $H_2O$ are added to the hot solution which is allowed to settle overnight at room temperature. The precipitate collected (72.1 g.) is crystallized from methanol. M.P. 232–234° C.

Calculated for $C_{39}H_{35}N_2O_5P$ (percent): C, 72.88; H, 5.49; N, 4.36; P, 4.83. Found (percent): C, 72.60; H, 5.39; N, 4.25; P, 4.70.

$[\alpha]_D^{23} = -402°$ C. (MeOH; c.=0.956).

47 grams of salt cinchonidine-(−)BPA are added to 300 ml. of 6N HCl; the mixture is stirred for 15 hours at room temperature. The obtained precipitate is filtered and washed with water twice. Yield: 24 grams of (−)-binaphthylphosphoric acid; (−)-BPA.

Calculated for $C_{20}H_{13}O_4P$ (percent): C, 68.97; H, 3.77; P, 8.91. Found (percent): C, 68.92; H, 4.02; P, 8.65.

$[\alpha]_D^{18} = -580°$ ($CH_3OH$).

EXAMPLE 14

(−)-2,2′-Dimethyl-α-Binaphthylphosphoric Acid 5.6 grams of pyridine (±)-2,2′-dimethyl-binaphthyl phosphate prepared according to Example 4 and 3.6 grams of cinchonine are dissolved in ethanol. Yield: 5.12 grams. The compound is crystallized from ethanol twice. Yield: 1.8 grams.

The salt obtained is suspended in 2 ml. of methanol and 10 ml. of N HCl solution. The mixture is stirred for 30 minutes at room temperature and the precipitate is collected and washed with water several times. Yield: 1:1 grams of amorphous phosphate, (−)-2,2′-dimethyl-α-binaphthylphosphoric acid.

$[\alpha]_J^{22} = -588°$ (EtOH; c.=0.25).
$[\alpha]_J^{22} = -495°$ ($CHCl_3$; c.=0.23).

The methyl ester is prepared by adding 7 ml. of ethereal solution of diazomethane to 225 ml. of acid suspended in 10 ml. of methyl alcohol. The mixture is stirred for 10 hours at room temperature; 100 ml. of ethyl ether are added, and the solution is washed with $NaCO_3$ and water, dried and the residue crystallized from MeOH. Methyl ester: M.P. 162° C.

$[\alpha]_J^{22} = -583°$ (MeOH; c.=0.4).

Calculated for $C_{23}H_{19}O_4P$ (percent): C, 70.77; H, 4.91. Found (percent): C, 70.85; H, 4.8.

NMR Spectra: P—$OCH_3$=3.9 p.p.m. $J_{HP}$=11 Hz.; $CH_3$=2.6 p.p.m. $J_{HP}$=2.52 p.p.m.

EXAMPLE 15

Resolution of Optical Isomers (+)-α-p-ethoxyphenylamino-N-n-propyl-propionamide 70 grams of (−)-binaphthylphosphoric acid and 50.6 grams (±)-α-p-ethoxyphenylamino-N-n-propyl-propionamide are added to hot stirred acetone. The mixture is allowed to settle overnight at 4° C. The precipitate (53 grams) is filtered and crystallized several times from methanol-acetone. The mixed filtrates are used in Example 16.

40 grams of the salt formed is dissolved in methanol and 6N HCl is added to pH 1. The precipitate, (−)-binaphthylphosphoric acid, is filtered and stored. The solution is extracted with ethyl ether and 2N $NH_3$ solution. The organic solution is washed with water, dried over anhydrous $Na_2SO_4$, and evaporated under vacuum. Yield: 6.1 grams (+)-α-p-ethoxyphenylamino-N-n-propyl-propionamide.

Calculated for $C_{14}H_{22}O_2N_2$ (percent): C, 67.17; H, 8.86; N, 11.19. Found (percent): C, 67.11; H, 8.87; N, 11.27.

$[\alpha]_D^{24} = -37°$ ($CHCl_3$; c.=0.978).

U.V. in ethanol.

$\lambda_{max}$ 242 mμ; ε=12.500.
$\lambda_{max}$ 307 mμ; ε=2.240.

EXAMPLE 16

-α-p-Ethoxyphenylamino-N-n-Propyl-Propionamide

The mixed methanol-acetone filtrates from Example 15 obtained by filtration of (+)-α-p-ethoxyphenylamino-N-n-propyl-propionamide-(−)-BPA salt is concentrated under vacuum to 120 ml. The obtained precipitate formed by (−)-α-p-ethoxyphenylamino - N - n - propyl-propionamide-(−)-BPA is dissolved in methanol-acetone and recrystallized to produce crystals of (−)-α-p-ethoxyphenylamino-N-n-propyl-propionamide.

$[\alpha]_D^{23} = -34°$ ($CHCl_3$; c=2.9).

EXAMPLE 17

-α-p-Ethoxyphenylamino-N-n-Propyl-Propionamide 3.6 grams of (±)-α-p-ethoxyphenylamino-N-n-propyl-propionamide and 4.89 grams of (−)-binaphthylphosphoric acid are added to 225 ml. of hot stirred acetone. The mixture is allowed to settle overnight at 4° C. The formed precipitate is treated as in Example 15. Yield: 0.30 grams of (−)-α-p-ethoxyphenylamino-N-n-propyl-propionamide.

$[\alpha]_D^{23} = -42°$ ($CHCl_3$; c=0.73).

EXAMPLE 18

(−)-Perhexiline; (−)-2-(2,2-Dicyclohexylethyl)-Piperidine 6 grams of (±)-perhexiline and 7.5 grams of (+)-binaphthylphosphoric acid are dissolved in 130 ml. of hot methanol 1100 ml. of acetone to the hot solution. The mixture is allowed to settle for 2 days at 4° C. The precipitate is filtered, washed with acetone and then crystallized from methanol-acetone (1:1). The solution is reserved for preparation of (—)-perhexiline in Example 19. The precipitate formed by (—)-perhexiline (+)-BPA is extracted with a mixture of ethyl ether and 2N NaOH solution. The organic solution is washed with water, dried over anhydrous $Na_2SO_4$; and HCl alcoholic solution is added to bring the filtrate to pH 1.

The mixture is allowed to settle overnight at 4° C., then the precipitate is filtered, washed with ethyl ether and dried to produce (—)-perhexiline. M.P. 234–236° C.

$[\alpha]_D^{21} = -14.5$ ($CH_3OH$; c=4.34).

Calculated for $C_{19}H_{36}ClN$ (percent): C, 72.69; H, 11.56; H, 4.46; Cl, 11.29. Found (percent): C, 72.40; H, 11.58; H, 4.32; Cl, 11.17.

EXAMPLE 19

(+)-Perhexiline; (+)-2-(2,2-Dicyclohexylethyl)- Piperidine

The reserved methanol-acetone solution from Example 18 is concentrated to 70 ml. under vacuum. The obtained precipitate is filtered, crystallized from methanol and then extracted with 2N NaOH solution and ethyl ether. The organic solution is washed with water, dried over anhydrous $Na_2SO_4$, and HCl alcoholic solution is added to the filtrate to pH 1. The mixture is settled overnight at 4° C., then the precipitate is filtered, washed with ethyl ether and dried. (+)-Perhexiline HCl is obtained. M.P. 233–235° C.

$[\alpha]_D^{21} = +14.5°$ ($CH_3OH$; c=2.27).

EXAMPLE 20

(+)-Diethylpropion, (+)-2-Diethylamino-Propiophenone 4 grams of (±) diethylpropion and 6.7 grams of (+)-binaphthylphosphoric acid are dissolved in 100 ml. of hot acetone. The solution is allowed to settle for 24 hours at +4° C.; the precipitate is filtered and crystallized from acetone. The filtrate is used in Example 21. The salt is added to methanol and to this mixture 6N HCl is added to pH 1 and stirred for 3 hours. The precipitate, formed by (+)-binaphthylphosphoric acid, is filtered and the solution is made alkaline with 2N NaOH and extracted twice with ether. The organic solution is washed with water, dried over $Na_2SO_4$ and concentrated under vacuum. The residue is (+)-diethylpropion.

$[\alpha]_D^{21} = +29.8°$.

EXAMPLE 21

(—)-Diethylpropion, (—)-2-Diethylamino-Propiophenone

The acetone solution obtained after filtration in Example 20 is concentrated under vacuum to 30 ml. volume. The precipitate is filtered and recrystallized from acetone. The salt is added to 30 ml. of methanol and 5 ml. of 6N HCl. The mixture is stirred for 3 hours.

The precipitate, (+) binaphthylphosphoric acid, is filtered and the solution is extracted from a mixture of N $NH_3$ solution and ethyl ether. The organic solution is washed with water, dried over anhydrous $Na_2SO_4$ and concentrated under vacuum; the residue is (—)-diethylpropion.

$[\alpha]_D^{22} = -31°$ ($CH_3OH$; c=0.554).

EXAMPLE 22

(+)-α,α-Diphenyl-α-(2-Piperidyl)-Methanol 2.63 grams of (±)-α,α-diphenyl-α-(2-piperidyl)-methanol and 3.43 grams of (+)-binaphthylphosphoric acid are added to 20 ml. of methanol. The mixture is stirred for 2 hours and then allowed to settle at —10° for 1 hour. The precipitate, (+)-α,α-diphenyl-α-(2-piperidyl)-methanol (+)-(+)-BPA is filtered and crystallized from methanol—$H_2O$ (1:1).

Yield: 2.3 grams. M.P. 286–287° C.

$[\alpha]_D^{17} = +324°$ (MeOH; c=0.4).

Calculated for $C_{38}H_{34}NPO_4$ (percent): C, 74.14; H, 5.56; N, 2.28. Found (percent): C, 74.18; H, 5.52; N, 2.35.

Thin Layer Chromatography

Silica Gel-propanol (80): $H_2O$ (15): HCOOH (5).
Rf=0.50 BPA.
Rf=0.40 (+)-α,α-diphenyl-α-(2-piperidyl)-methanol.

The above salt is extracted with 150 ml. of ethyl ether and 30 ml. of 2N $NH_3$ solution. The collected ether solutions are washed with water, dried over anhydrous $NaSO_4$ and concentrated under vacuum. The residue (0.727 grams) is crystallized from petroleum ether to produce (+) - α,α - diphenyl-α-(2-piperidyl)-methanol. M.P. 90–91° C.

$[\alpha]_D^{21} = +60°$ (methanol; c=1.91).

Calculated for $C_{18}H_{21}NO$ (percent): C, 80.86; H, 7.92; N, 5.24. Found (percent): C, 80.59; H, 8.15; N, 5.31.

EXAMPLE 23

(+)-α,α-Diphenyl-α-(2-Piperidyl)-Methanol Hydrochloride 1.8 ml. of saturated HCl solution in isopropylic alcohol are added to 0.327 gram of (+)-α,α-diphenyl-α-(2-piperidyl)-methanol dissolved in 150 ml. of ethyl ether. The mixture is allowed to settle at room temperature for 4 hours.

The precipitate is filtered and crystallized from ethyl alcohol-petroleum ether (1:1) to produce (+)-α,α-diphenyl - α - (2-piperidyl) - methanol hydrochloride. M.P. 298–301° C.

$[\alpha]_D^{21} = +38°$ (MeOH; c=2.02).

Calculated for $C_{18}H_{22}ClNO$ (percent): C, 71.16; H, 7.29; N, 4.61; Cl, 11.67. Found (percent): C, 71.22; H, 7.49; N, 4.56; Cl, 11.44.

EXAMPLE 24

(—)-α,α-Diphenyl-α-(2-Piperidyl)-Methanol

The methanol mother solution from Example 23 is concentrated under vacuum to 10 ml. and then extracted with a mixture of ethyl ether and 30 ml. of 2N NaOH solution. The aqueous phase is washed with water twice. The collected organic solutions are washed with water, dried over anhydrous $Na_2SO_4$ and concentrated under vacuum. The residual is crystallized from ethanol-$H_2O$ (3:1) to yield 0.758 gram of (—)-α,α-diphenyl-α-(2-piperidyl)-methanol. M.P. 88–91° C.

$[\alpha]_D^{21} = -53.5°$.

Calculated for $C_{18}H_{21}NO$ (percent): C, 80.86; H, 7.92; N, 5.24. Found (percent): C, 81.04; H, 8.01; N, 5.15.

EXAMPLE 25

(—)-Ephedrine Hydrochloride 6.9 grams of (+)-binaphthylphosphoric acid are added slowly to 3.3 grams of DL-ephedrine dissolved in 200 ml. of acetone. The mixture is stirred for three hours and allowed to settle for 30 minutes at 4° C. The precipitate is collected and the solution is stored in order to recover (+)-ephedrine. 6N HCl is added to the precipitate suspended in few ml. of methanol and adjusted to pH 1. After stirring for 1 hour the mixture is filtered; the solution is alkalized by addition of concentrated $NH_4OH$ solution and then extracted with ethyl ether. The organic phase is washed with very little water, dried over anhydrous $Na_2SO_4$ and filtered. Alcoholic HCl solution is added and the mixture allowed to settle for 1 hour at 4° C., is then filtered.

Yield: 0.3 gram of (—)-ephedrine·HCl, e.H. M.P. 200–203° C.
$[\alpha]_D^{18} = -32.6°$ (CH$_3$OH; c.=4.60).

EXAMPLE 26

(+)-Ephedrine Hydrochloride

The stored acetone solution from Example 25 is concentrated under vacuum. The collected residue is crystallized from acetone, the crystals are suspended in 6N HCl in a few ml. of methanol, adjusted to pH 1. After 1 hour stirring, the precipitate (BPA) is discarded; the solution made alkaline by adding 2N aqueous NH$_3$ and then extracted with ether. The ethereal solution is washed with little water and dried. The solution, added to alcoholic HCl (sature solution) to acid pH, is allowed to settle for 1 hour at 4° C. and filtered.

Yield: (+)-ephedrine hydrochloride 0.28 gram. M.P. 198–201° C.
$[\alpha]_D^{18} = +38.5$ (CH$_3$OH; c.=2.27).

EXAMPLE 27

(+)-p-(3-Hydroxy-Propioxy)-Phenylamino-N-n.Propyl-Propionamide 1.74 grams of binaphthylphosphoric acid and 1.40 grams of p.(3-hydroxy-propioxy)-phenylamino-N-n.propyl-propionamide are dissolved in 70 ml. of acetone by heating to 50° C. The solution is allowed to settle overnight at room temperature. The collected precipitate is crystallized from acetone-methanol (20:1).

Yield: 0.46 gram of (+)-p.(3-hydroxy-propioxy)-phenylamino-N-n.propyl-propionamide. (+)BPA salt. M.P. 186–188° C.
$[\alpha]_D^{19} = +308°$ C.

0.42 gram of salt dissolved in 0.8 ml. of methanol are treated with 6N HCl. The precipitate is (+)binaphthylphosphoric acid. The solution, made alkaline by addition of 2N NaOH, is extracted with ethyl acetate. The organic solution is then washed with water, dried over anhydrous Na$_2$SO$_4$ and the solvent is evaporated under vacuum. The residue is treated with petroleum ether, filtered and dried under vacuum.

Yield: 0.145 g. of (+)-p.(3-hydroxy-propioxy)-phenylamino-N-n.propyl-propionamide. M.P. 82–83° C.
$[\alpha]_D^{20} = +33.8$ (CHCl$_3$; c.=2.22).

Calculated for C$_{15}$H$_{24}$N$_2$O$_3$ (percent): C, 64.26; H, 8.63; N, 9.99. Found (percent): C, 64.35; H, 8.47; N, 9.91.

EXAMPLE 28

(—)-3-(3,4-Dihydroxyphenyl)Alanine; (—)-DOPA 5.378 grams of (±)-DOPA and 9.5 grams of (+)-binaphthylphosphoric acid are dissolved in 53 ml. of methanol. A little quantity of base (about 100 mg.) are not dissolved, thus the reaction mixture is filtered and the limpid solution is evaporated to dryness under vacuum and at room temperature. A gummy residue is obtained which is dissolved in 20 ml. of ethanol. To the solution, 30 ml. of water are added. Crystallization of the salt is obtained by adding some previously prepared crystals or by rubbing the container wall with a glass stick. The solution is allowed to settle for 1 hour at 4° C. The separated crystals are collected by filtration, washed with ethanol-water (1:1) and then with water. 6.43 grams of (—)-3-(3,4 - dioxyphenyl)alanine.(+)-binaphthylphosphate are obtained. M.P. 206–208° C.
$[\alpha]_D^{23} = +380$ (MeOH; c.=0.23).

Calculated for C$_{29}$H$_{24}$NO$_8$P (percent): C, 63.86; H, 4.44; N, 2.57. Found (percent): C, 63.65; H, 2.46.

A solution of the above (—)-DOPA salt of (+)-BPA (6.1 grams) in methanol (25 ml.) is mixed with a 10% sodium acetate aqueous solution in methanol water (9:1) and is allowed to settle at room temperature for 4 hours. The precipitate is filtered, washed with 5 ml. of methanol and with ether and gave 1.7 grams of (—)-DOPA. M.P. 266–267° C.
$[\alpha]_D^{22} = -11$ (4% HCl; c.=1.7).

Calculated for C$_9$H$_{11}$NO$_4$ (percent): C, 54.82; H, 5.62; N, 7.10. Found (percent): C, 54.58; H, 5.84; N, 6.90.

EXAMPLE 29

(+)-3-(3,4-Dihydroxyphenyl)Alanine; (+)-DOPA

The (+)-isomer was obtained by mixing the filtrate obtained in Example 28 after separation of (—)-DOPA salt of BPA, with 12.4 ml. of 10% sodium acetate solution dissolved in aqueous methanol (9:1). The mixture is allowed to settle for two days at 4° C. and the precipitate is filtered, washed with 10 ml. of methanol and then with ethyl ether to yield 1 gram of (+)-DOPA. M.P. 273–274° C.
$[\alpha]_D^{23} = +11.9$ (4% HCl; c.=2.2).

Calculated for C$_9$H$_{11}$NO$_4$ (percent): C, 54.82; H, 5.62; N, 7.10. Found (percent): C, 54.88; H, 5.85; N, 6.97.

EXAMPLE 30

(+)-1,2,3,4,5,6 - Hexahydro - 6,11 - Dimethyl - 3 - (3-Methyl - 2 - Butenyl)-2,6-Methanol-3-Benzazocine-8-ol.(+)-Pentazocine 1.0 gram of pentazocine dissolved in 20 ml. of acetone is added to 1.22 grams of (+)-binaphthylphosphoric acid and is suspended in 125 ml. of acetone. The mixture is heated until the acid is completely dissolved and the final volume is 100 ml. The precipitate obtained after heating is filtered and crystallized from acetone.

Yield: 1.2 grams. M.P. 307–308° C. d.

The acetonic solution is stored for the preparation of (—)-isomer.

Calculated for C$_{39}$H$_{40}$NPO$_5$ (percent): C, 73.92; H, 6.36; N, 2.21. Found (percent): C, 74.00; H, 6.38; N, 2.24.

1.2 grams of salt are added to 15 ml. of 10% NaOH and extracted with ethyl ether. The aqueous solution is acidified with concentrated HCl and made alkaline with concentrated NH$_4$OH, then it is extracted with ethyl ether. The ethereal solutions are washed with water, dried over MgSO$_4$ and concentrated to 2 ml. The precipitate is crystallized from ether.

Yield: 0.3 gram of (+)-pentazocine. M.P. 178–180° C.
$[\alpha]_D^{25} = 134.2$.

EXAMPLE 31

Cis-Clomiphene (Isomer B); Cis-N,N-Diethyl-N-(2-[p-(β-Chlor-α-Phenyl-Styryl)-Phenoxy]-Ethyl)-Amine 3.48 grams of racemic binaphthyl-phosphoric acid are added under stirring to a mixture of 5.97 grams of clomiphene dihydrogen citrate in 20 ml. of methanol. When the precipitate starts separating from the solution, the stirring is stopped and the mixture is allowed to settle at room temperature for 2 hours. The precipitate is filtered, washed with methanol and ether and dried under vacuum. The filtered solution is stored. The obtained precipitate, 4.28 grams, is clomiphene-BPA salt. M.P. 220–222° C.

Thin Layer Chromatography on Silica Gel

Solvent: propanol (180): H$_2$O (15): formic acid (5).
Two spots: Rf 0.35 clomiphene Rf 0.60 binaphthylphosphoric acid.

The clomiphene-BPA salt is extracted with ethyl ether and 2N NH$_3$ solution. To the organic solution washed with water and dried over anhydrous Na$_2$SO$_4$, 1.2 grams of citric acid dissolved in ethanol is added. The solution is allowed to settle for 1 hour at room temperature; the precipitate is then filtered and dried under vacuum. Yield: 3.28 grams. M.P. 133–135° C. of cis-clomiphene.

As used herein, the cisclomiphene isomer means the isomer with the following physicochemical characteristics.

Ultraviolet Absorption Spectra.—The citrate salt in methanol exhibits peaks at 239 mμ (ε 22,000) and 296 mμ (ε 11,400) while in 0.1 N HCl (U.V. No. 0-2267) the absorption are at 238 mμ (ε 20,500) and 294 mμ (ε 10,200).

Infrared Absorption Spectra.—The citrate, in KBr exhibits aromatic C–H bands at 693 cm.$^{-1}$ (sh: 690 cm.$^{-1}$), 752 cm.$^{-1}$ (sh: 746 cm.$^{-1}$ and 756 cm.$^{-1}$ and 837 cm.$^{-1}$.

The base exhibits these peaks, more clearly defined, at 693, 696 cm.$^{-1}$ (doublet), 747, 758 cm.$^{-1}$ (doublet) and 836 cm.$^{-1}$.

Nuclear Magnetic Resonance Spectrum.—The N.M.R. spectrum (CHCl$_3$) of the base is characterized as follows:

| Chemical shift (δ) | Splitting pattern | No. H | Assignment |
|---|---|---|---|
| 0.99 | Triplet | 3 | CH$_3$ of Et$_2$N—. |
| 2.53 | Quartet | 4 | CH$_2$ of Et$_2$N—. |
| 2.73 | Triplet | 2 | CH$_2$ of >N—CH$_2$—CH$_2$O—. |
| 3.84 | do | 2 | CH$_2$ of —CH$_2$O—. |
| 6.52* | Doublet* | 2 | Aromatics *ortho* to basic ether. |
| 6.82* | do.* | 2 | Aromatics *meta* to basic ether. |
| 7.18 | Multiple | 5 | Aromatics of unsubstituted φ trans to basic ether φ. |
| 7.35 | Singlet | 5 | Aromatics of unsubstituted φ to geminal to basic ether. |

*A$_2$B$_2$ pattern at 6.52, 6.82.

Dipole Moment Measurements.—The base, measured in benzene at room temperature, exhibits a dipole moment of 2.860±0.008D.

The other isomer is termed herein as the trans-clomiphene.

EXAMPLE 32

Trans-Clomiphene

The stored methanol solutions from Example 31 are made alkaline by adding 2 ml. of concentrated NH$_3$ solution and diluted with 20 ml. of water. This mixture is extracted three times each with 100 ml. of ether. To the organic solution, washed with water and dried over anhydrous Na$_2$SO$_4$, 0.8 gram of citric acid, dissolved in ethanol, are added. The mixture is allowed to settle for 30 minutes at room temperature then the precipitate is separated by filtration and dried. Yield: 1.665 grams of trans-clomiphene. M.P. 120–126° C., of distinctive I.R. spectra.

What is claimed is:

1. The essentially pure single optical isomer of a compound of the structural formula

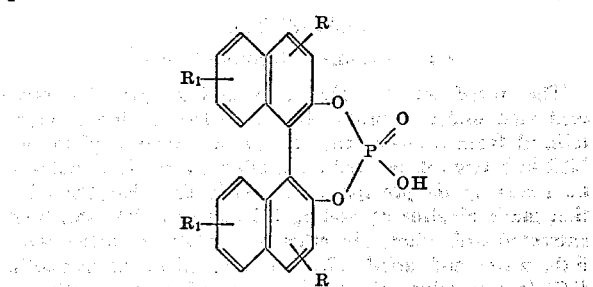

in which R and R$_1$ are symmetrical and independently hydrogen, halogen, lower alkyl of 1 to 8 carbon atoms inclusively or nitro, and their corresponding bi-4,5,6,7-tetrahydronaphthyl compounds essentially free of the corresponding isomer.

2. The essentially pure (+)-isomer of a compound of claim 1 essentially free of the corresponding (—)-isomer.

3. The essentially pure (—)-isomer of a compound of claim 1 essentially free of the corresponding (+)-isomer.

4. Essentially pure binaphthyl phosphoric acid single optical isomer of claim 1 wherein R and R$_1$ are hydrogen.

5. Essentially pure (+)-binaphthylphosphoric acid of claim 1 in which R and R$_1$ are hydrogen, essentially free of the corresponding (—)-isomer.

6. Essentially pure (—)-binaphthyl phosphoric acid of claim 1 in which R and R$_1$ are hydrogen essentially free of the corresponding (+)-isomer.

7. The essentially pure single optical isomer of claim 1, wherein R is hydrogen and R$_1$, R$_1$ are 3,3'-dimethyl, 2,2'-dimethyl, 2,6-dimethyl, 5,5'-dibromo, 6,6'-dibromo or 6,6'-dinitro.

8. Essentially pure bi-(4,5,6,7-tetrahydronaphthyl) phosphoric acid single optical isomer of claim 1 wherein R and R$_1$ are hydrogen.

References Cited

UNITED STATES PATENTS

| 1,684,738 | 9/1928 | Marschalk | 260—936 |
| 3,595,881 | 7/1971 | Shuman | 260—989 |
| 3,597,510 | 8/1971 | Pollak et al. | 260—989 |

LORRAINE A. WEINBERGER, Primary Examiner

R. L. RAYMOND, Assistant Examiner

U.S. Cl. X.R.

260—293.54, 293.65, 293.84, 519, 559 A, 570 R, 570.5 C, 570.6